Aug. 27, 1957  G. K. TURNER  2,804,046
CATTLE CHUTE
Filed May 31, 1956  3 Sheets-Sheet 3
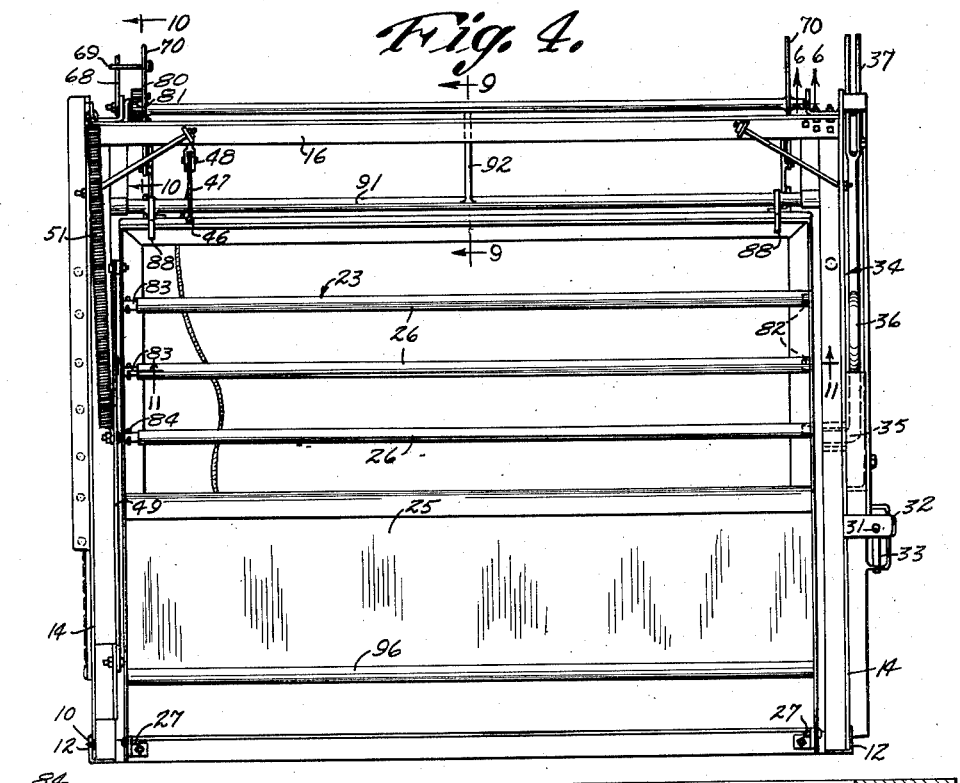
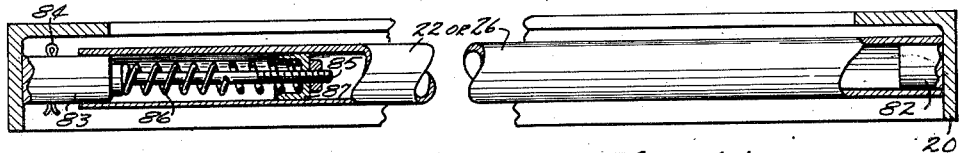
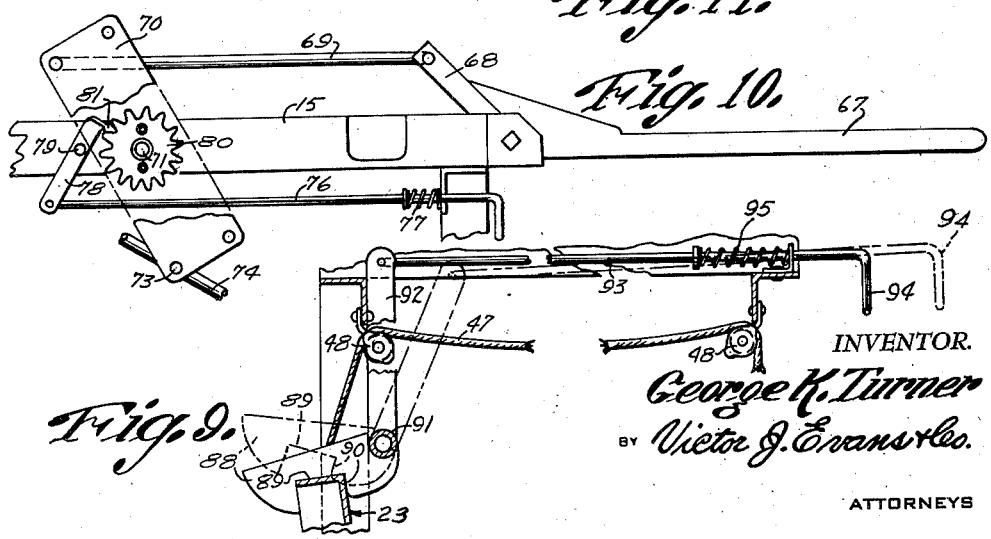
INVENTOR.
George K. Turner
BY Victor J. Evans & Co.
ATTORNEYS United States Patent Office 2,804,046
Patented Aug. 27, 1957

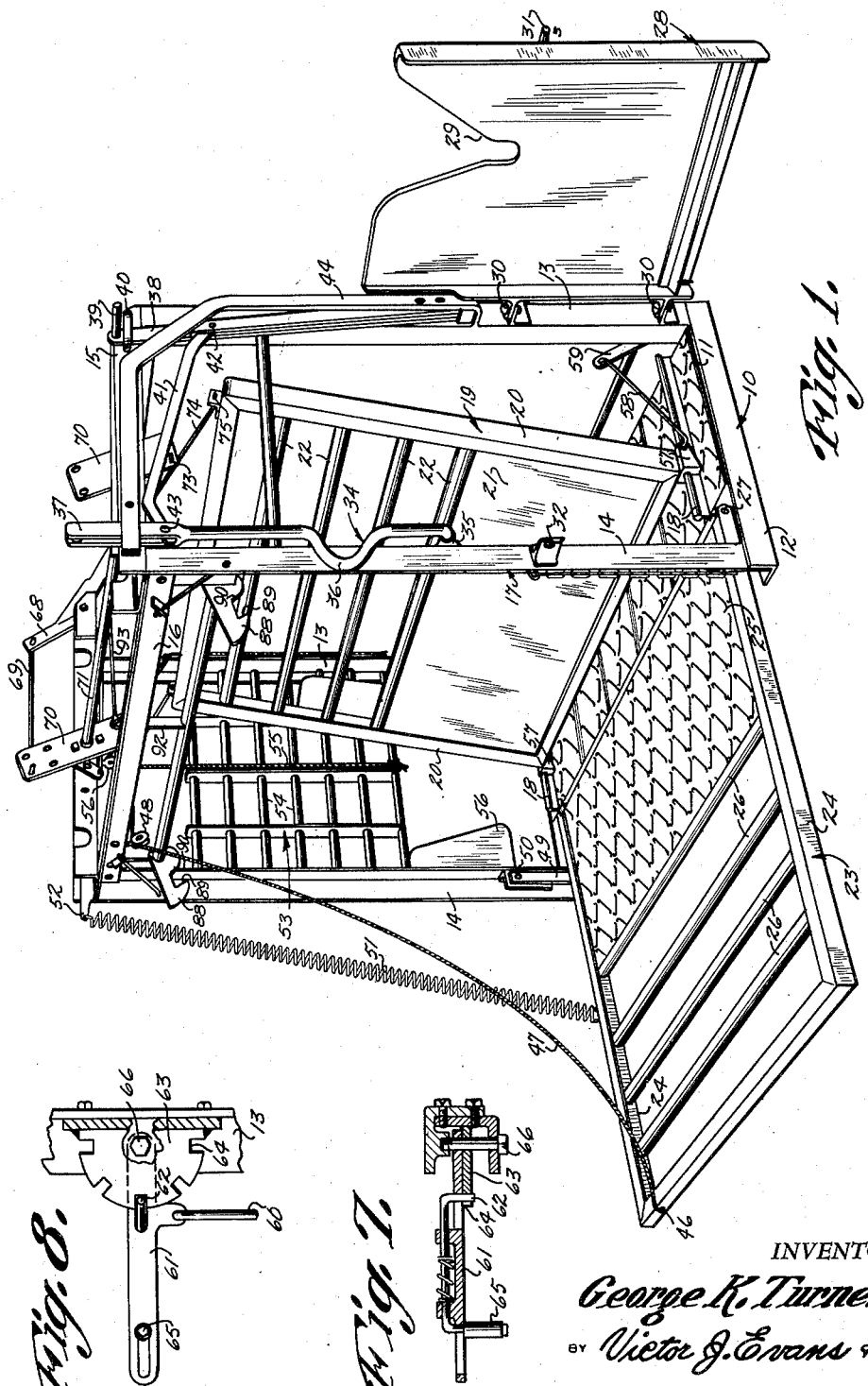

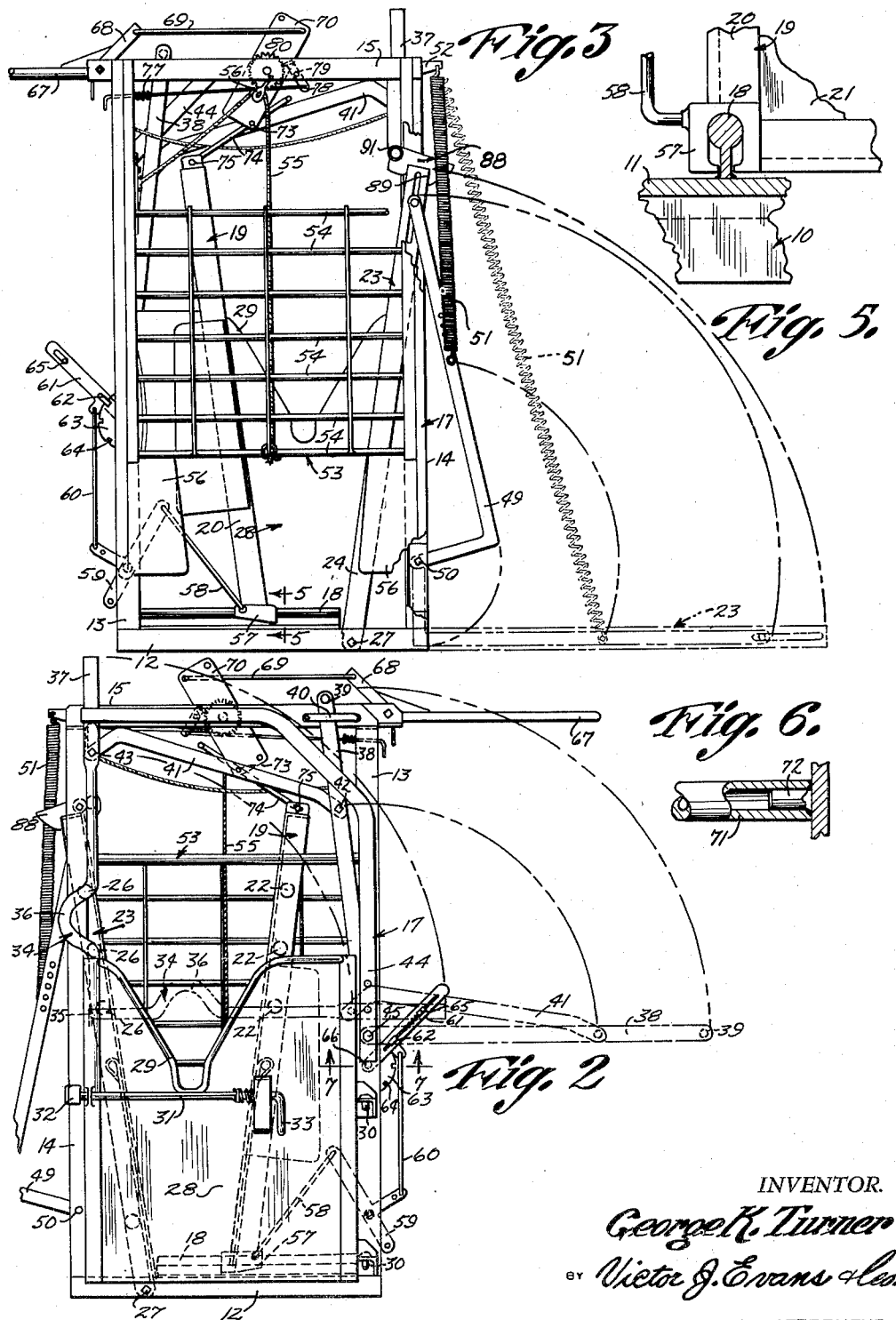

2,804,046

CATTLE CHUTE

George K. Turner, Cimarron, N. Mex.

Application May 31, 1956, Serial No. 588,282

5 Claims. (Cl. 119—99)

This invention relates to agricultural equipment, and more particularly to a cattle chute.

The object of the invention is to provide a cattle chute which can be readily opened or closed as when cattle are being led into or out of the chute.

Another object of the invention is to provide a chute for holding cattle as when the cattle are being branded or treated medically or the like, the chute of the present invention including a manually operable means for opening and closing various components of the chute, and wherein there is further provided a latching means for insuring that the chute will not accidentally open.

A still further object of the invention is to provide a cattle chute which includes a frame and a first side wall which can have its angular position adjusted as desired, there being a second side wall which is mounted for swinging movement about a horizontal axis so that when the second side wall is in lowered position, the animal can readily walk thereover, there being a gate hingedly connected to the frame and the gate including a means for receiving a portion of the animal's neck so as to help restrain the animal while it is being worked on.

A further object of the invention is to provide a cattle chute which is extremely simple and inexpensive to manufacture.

Other objects and advantages will be apparent during the course of the following description.

In the accompanying drawings, forming a part of this application and in which like numerals are used to designate like parts throughout the same:

Figure 1 is a perspective view of the cattle chute, showing the gate and side wall in open position.

Figure 2 is a front elevational view looking at one end of the device, and showing the gate and side wall in closed position.

Figure 3 is a view looking at the opposite end from Figure 2.

Figure 4 is a side elevational view of the cattle chute, with the side wall in closed or raised position.

Figure 5 is an enlarged sectional view taken on the line 5—5 of Figure 3.

Figure 6 is an enlarged fragmentary sectional view, illustrating one of the shafts for supporting the rotatable casing.

Figure 7 is an enlarged sectional view taken on the line 7—7 of Figure 2.

Figure 8 is an enlarged fragmentary elevational view illustrating the manually operable handle and sector plate.

Figure 9 is an enlarged sectional view taken on the line 9—9 of Figure 4.

Figure 10 is an enlarged sectional view taken on the line 10—10 of Figure 4.

Figure 11 is an enlarged fragmentary plan view illustrating one of the horizontal bars in the side walls, and with parts broken away and in section.

Referring in detail to the drawings, the numeral 10 designates a horizontally disposed base which includes a horizontal platform 11 that may have its upper surface roughened, Figure 1, so that the animal will not have a tendency to slip thereon. Secured to the ends of the base 10 is a pair of horizontally disposed spaced parallel bars 12 which may be of L-shape. Extending upwardly from one end of each of the bars 12 is a first vertically disposed post 13. Extending upwardly from the other end of each of the bars 12 is a second vertically disposed post 14. Horizontally disposed braces 15 extend between the first and second bars 13 and 14, and a horizontally disposed cross piece 16 extends between the upper end of the post 14. These members may constitute part of a framework 17.

Secured to the upper surface of the base 10 in any suitable manner, as for example by welding, is a pair of spaced parallel horizontally disposed tracks or rails 18. A first side wall 19 is provided, and the side wall 19 includes a pair of spaced parallel arms 20 which may have a plate 21 extending therebetween. The side wall 19 further includes a plurality of horizontally disposed spaced parallel removable rods 22 so that certain of the rods 22 can be removed so as to provide clearance for a person working on the animals being restrained in the chute.

There is further provided a second side wall which is indicated generally by the numeral 23, and the side wall 23 includes a pair of spaced parallel arms 24 that has a plate 25 extending therebetween. The second side wall 23 is provided with a plurality of removable rods 26. The second side wall 23 may be hingedly connected to the base 10 through the medium of hinge pins 27 so that the side wall 23 is adapted to swing about a horizontal axis as when an animal is being led into or out of the chute.

There is further provided a hingedly mounted gate 28 which is provided with a recess 29 in its upper portion for receiving the neck of the animal being worked on. The gate 28 may be hingedly connected to the post 13 through the medium of pivot pins 30. A means is provided for maintaining the gate 28 in locked or latched position, and this means comprises a keeper 31 which is mounted for movement into and out of engagement with a latch 32 that may be secured to one of the posts 14. A handle 33 is provided for operating the keeper 31.

There is further provided a body member which is indicated generally by the numeral 34, and the body member 34 is adapted to cooperate with the recess 29 in the gate 28 so as to help restrain the animal's neck in the recess 29. The body member 34 includes a lower portion 35 which is pivotally connected to a post 14, and the body member 34 further includes an offset portion 36 which may engage the upper portion of the animal's neck. The body member 34 is further provided with a bifurcated portion 37. A lever 38 has a hand grip 39 extending outwardly therefrom, and the lever 38 is adapted to seat or engage a clip 40 when the parts are in the position shown in Figure 1. A link 41 has one end pivotally connected to the lever 38 through the medium of a pivot pin 42, while the other end of the link 41 is pivotally connected to the bifurcated portion 37 of the body member 34 through the medium of a pivot pin 43. A stationary guide member 44 may be provided for maintaining the operating parts for the body 34 in their proper position. The lower end of the lever 38 may be pivotally connected to one of the posts 13 through the medium of a pivot pin 45.

As previously stated, the side wall 23 is mounted for swinging movement about a horizontal axis, and for raising the side wall 23, a cable 47 has one end connected to a securing element 46 on the end of the side wall 23. The cable 47 may be arranged in engagement with pulleys 48 which can be mounted in the chute. There is further provided a support member 49 which may have an L-shape, Figure 3, and one end of the support member 49 may be pivotally connected to the post 14 through the medium of a pivot pin 50. A coil spring 51 has one end connected to the support member 49, while the other end of the coil spring 51 is connected to a lug 52 which extends outwardly from the top of the frame. The coil spring 51 aids in raising the side wall 23 and helps to urge it upwardly into its raised position.

There is further provided a vertically adjustable or shiftable end wall 53 which may include a plurality of horizontally disposed rods 54. The end wall 53 may be slidably mounted in trackways which can be defined in the post of the framework. For raising or adjusting the elevation of the end wall 53, a cable 55 may have one end connected to the lowermost rod 54 of the end wall 53, and the cable 55 may be trained over a pulley 56'. Thus, by gripping the cable 55 and pulling on this cable, the wall 53 can be adjusted in position. Guard plates 56 may be secured to the post below the end wall 53.

There is further provided a means for adjusting the position of the first side wall 19 so that animals of different sizes can be accommodated in the present invention. For adjusting the lower end of the side wall 19, there is provided on the lower end of the side wall 19 a pair of clamps or carriages 57 which slidably engage the rails 18. Links 58 extend from the clamps 57, and levers 59 are pivotally connected to the links 58, Figure 3. Links 60 extend upwardly from the levers 59, and a handle 61 is pivotally connected to a link 60. The handle 61 carries a pawl or dog 62 which is mounted for movement into and out of engagement with notches 64 in a sector plate 63. A manually operable relief mechanism 65 is provided on the handle 61 for releasing the dog 62 from the notches 64 as when the handle 61 is to be moved. Thus, by releasing the dog 62, the handle 61 can pivot about the pivot pin 66, Figure 8, so that by pivoting the handle 61, the members 60, 59 and 58 can be moved and this in turn will cause movement of the clamps 67 along the rails 18 so that the lower end of the side wall can be shifted.

There is further provided a means for adjusting the upper end of the side wall 19, and this means comprises a crank 67 which has a brace 68 secured thereto, and a link 69 connects the brace 68 to one of a pair of brackets 70. The pair of brackets 70 are arranged in spaced parallel relation with respect to each other, and the brackets 70 are secured in any suitable manner, as for example by welding to a rotary casing or tube 71. The tube 71 is rotatably mounted on stud shafts 72 which may extend inwardly from the braces 15, Figure 6. The bracket 70 may be secured to tie rods 74 through the medium of pins 73, and the tie rods 74 may be connected to the upper end of the side wall 19 by means of a connection 75. For retaining the upper portion of the side wall 19 immobile on its various adjusted positions, a manually operable crank 76 is provided, and the crank 76 may have a coil spring 77 thereon, Figure 10. The crank 76 operates a dog 78 which is pivotally mounted to a portion of the frame through the medium of a pivot pin 79, and the dog 78 carries a finger 81 which is mounted for movement into and out of engagement with teeth on a wheel 80. The wheel 80 is secured as by welding to the tube 71. Thus, to adjust the angular position of the top of the side wall 19, the crank 76 is moved to compress the coil spring 77 and this releases the finger 81 from the toothed wheel 80. Then, the crank 67 can be pivoted and this moves the brace 68 which in turn moves the link 69 and this results in movement of the bracket 70. This movement of the bracket 70 cause movement of the tie rod 74 which in turn causes movement of the side wall 19. As previously described, it is necessary to first release the finger 81 from the toothed wheel 80 by means of the crank 76, before the crank 67 can be used to pivot the side wall 19.

Referring to Figure 11 of the drawings, there is shown a detail arrangement of the removable rods such as the rods 22. Thus, the rods 22 may have one end arranged in engagement with a short stub shaft 82 which can extend inwardly from the arm 20. There is further provided a longer stub shaft 83 which extends inwardly from the other arm 20 of the side wall, and the rods 22 are arranged in engagement with the stub shafts 82 and 83. A cotter key or pin 84 extends transversely through the stub shaft 83, and a bolt 85 may extend from an end of the stub shaft 83. A coil spring 86 is circumposed in the bolt 85, and a plunger 87 is mounted on an end of the bolt 85, the plunger 87 being arranged in the rod 22. Thus, it will be seen from Figure 11 that sufficient clearance may be provided between an end of the rod 22 and the arm 20 so that by shifting the rods 22 laterally, the rods 22 can be disengaged from the stub shafts 82 and 83 as when access is to be gained to the animals, as for example when the animals are to be branded or otherwise treated.

There is further provided a latching mechanism for retaining the side wall 23 in its raised or closed position, and this means comprises a pair of latches or keepers 88 which are each provided with a notch or cutout 89 therein. The notches 89 define in the keepers 88 a shoulder 99 for a purpose to be later described. The keepers 88 are secured to a tube or hollow rod 91, and lugs 92 extend upwardly from the tube 91. A crank 93 is connected to the lug 92, and the crank 93 may be provided with a hand engaging portion 94 on an end thereof, Figure 9. A coil spring 95 is arranged in engagement with the crank 93.

The side wall 23 may be provided with a horizontal brace 96, Figure 4. It is to be understood that the construction shown in Figure 11 can be used for either the removable rods 22 or the removable rods 26.

From the foregoing, it is apparent that there has been provided a chute which is especially suitable for use in restraining animals such as cattle while they are being worked on. For example the chute of the present invention can be used for restraining or holding cattle or other animals when such animals are being branded or treated for diseases or the like. In use, the side wall 23 can be initially moved to the position shown in Figure 1, and the animal to be worked on is then moved into the chute so that the animal stands on the platform 11. Then, by pulling on the cable 47 the side wall 23 will be raised from the position shown in Figure 1 to the position shown in Figures 2, 3 and 4. When the side wall 23 moves to its raised position, it engages the latches 88 and the top of the side wall 23 seats in the cutouts 90 so that the side wall 23 is latched or locked in its raised position. Then, the gate 28 can be swung from the open position shown in Figure 1 to the closed position shown in Figures 2, 3 and 4 and the recess 29 will receive or engage the lower portion of the animal's neck. Next, the grip 39 can be manually gripped in the user's hand or operator's hand and by means of the grip 39, the lever 38 can be swung down from the solid line position shown in Figure 2 to the broken line position shown in Figure 2 and this will move the link 41 which in turn will result in swinging movement of the body member 34. Thus, the body member 34 can be moved from the solid line position shown in Figure 2 to the broken line position shown in Figure 2 so that the offset portion 36 of the body member 34 will be arranged above the recess 29 whereby the animal's neck or head will be clamped between the body member 34 and recess 29. Thus, it will be seen that there will be provided an enclosure from which the animal can not accidentally escape or work loose while the animal is being handled or otherwise treated.

The chute of the present invention includes a number of adjustable features so that animals of different sizes can be accommodated and also due to the adjustability of the various features and the removability of certain parts, the operator or person working on the animal can readily gain access to the animal within the chute. For example there is provided a cable 55 which is connected to the lower end of a vertically slidable end wall 53 so that by pulling on the cable 55, the end wall 53 can be raised or lowered as desired. Furthermore, the angular position of the first side wall 19 can be adjusted by means of the previously described structure. For example, to move the lower end of the first side wall 19, it is only necessary to first actuate the release mechanism 65 on the handle 61 and this will cause the dog 62 to move out of engagement with the notches 64 on the sector plate 63. With the dog 62 out of the notches 64, the handle 61 can pivot and this pivotal movement of the handle 61 moves the link 60 which in turn results in pivotal movement of the lever 59. As the lever 59 moves, it moves the link 58 and this movement of the link 58 results in movement of the clamp 57 along the rail 18. After the lower end of the side wall 19 has been adjusted or moved to the desired position with respect to the platform 11, the release mechanism 65 can be manually released so as to permit the dog 62 to engage one of the notches 64 whereby the lower end of the side wall 19 will be securely clamped in its adjusted position.

Similarly, to adjust the upper end of the side wall 19, the crank 76 can be moved to impress the coil spring 77 and this will release the finger 81 from the toothed wheel 80. With the finger 81 out of engagement with the toothed wheel 80, the crank 67 can be manually pivoted and this will move the brace 68 which in turn will move the link 69 and this movement of the link 69 will result in movement of the bracket 70. As the bracket 70 moves, the tube 71 will rotate and this rotation of the tube 71 will move the upper end of the side wall 19 through the medium of the pin 73 and tie rod 74. After the upper end of the side wall 19 has been adjusted in a desired position, the crank 76 is released so that the dog 81 will engage the tooth wheel 80 so as to maintain the parts immobile in their adjusted position.

There is further provided the coil spring 51 which helps the raising or lifting of the side wall 23 when the cable 47 is manually pulled. As previously described, the various rods 26 and 22 are removable due to the construction shown in Figure 11. Thus, by moving these rods laterally they can clear the stub shafts 82 and 83 so as to provide more clearance as when an operator desires to gain access to the animal within the enclosure. The gate 28 is maintained closed by means of the member 31 which engages the keeper 32, and the hand engaging portion 33 can be gripped when the gate 28 is to be unlocked.

Thus, with the present invention the operator can work on the cattle without danger of being injured by the cattle. The animal is restrained on all sides thereof and the head or neck is securely clamped in position. As shown in Figure 1, the side wall 23 can be swung to the lower horizontal open position and this is highly advantageous since it facilitates the positioning of the cattle into the chute or the removal of the cattle from the chute. To release the latches 88 it is only necessary to manually grip the handle portion 94 of the crank 93 and pull the crank 93 rearwardly whereby the link 72 will be pivoted so as to cause rotation of the tube 91, and this rotation of the tube 91 lifts or swings the latches 88 from the solid line position shown in Figure 9 to the broken line position shown in Figure 9 so that the gate 23 is free to pivot downwardly to the open position shown in Figure 1.

In Figure 1 the chute is shown with the side wall and gate in open position so that the animal in leaving the chute can walk over the side wall 23. Thus, when the side wall 23 is in raised position, it will be supported at four corners and this is important since this side is subjected to tremendous strain when large animals are being restrained. Furthermore, as shown in Figures 2 and 3 the side wall 23 has a sloping position when in raised position so that when the side wall 23 moves to the position shown in Figure 1, the entire side of the chute is open so that the animal can leave the chute without any danger of being skinned, bruised or otherwise damaged. The spring 51 serves to prevent the side wall 23 from striking the ground hard enough to bounce and also makes it possible to raise the side wall to the standing position with only a very slight pull on the rope 47. The L-shaped support member 49 keeps pressure on the side wall all the way up as the side wall is being raised so that the side wall is engaged by the latches 88. The latches 88 are constructed so that they act as a stop for the side wall as the side wall is raised to the standing position, and the latches 88 also serve to securely lock the side wall in place. The latches 88 are welded to the tube 91, and the tube 91 may be mounted on stub shafts so that the tube 91 can rotate. The removable bars 22 or 26 permit these members to be readily removed so as to facilitate branding or other operations on the animals. The spring 86 helps to hold the parts under sufficient tension so that the members 22 will not accidentally work loose, and the cotter keys 84 can be easily removed in the event that the various members 22 or 26 are to be taken off the stub shafts 82 and 83.

It is believed that the provision of the side wall 23 which swings or pivots about a horizontal axis instead of a vertical axis is an important advantage since the side wall can open instantly the full length of the chute. Also, since the side wall 23 is supported at four corners when in its raised position, there is provided a much more rigid construction than is possible with the type of side wall which swings like a gate. Also, the side wall will open immediately regardless of the position of the chute on the ground. For example in that type of side opening chute in which the side wall swings like a gate, it is necessary that the chute be set so that it is tilted towards the side which opens but with the present invention, the chute can be set so that it is tilted at a considerable angle towards the opposite side and it still will not interfere with the side opening in the proper manner. Furthermore, the present invention utilizes a positive and rigid latching mechanism and the side wall and gate can be opened easily and quickly. Furthermore, the entire unit can be readily disassembled when it is to be stored or shipped.

I claim:

1. In a cattle restraining chute, a frame, a horizontally disposed base arranged at the lower end of said frame and including a horizontally disposed platform, a pair of spaced parallel horizontally disposed L-shaped bars secured to the ends of said base, a first vertically disposed post extending upwardly from one end of each of said bars, a gate hingedly connected to one of said posts and provided with a neck receiving recess in the upper portion thereof, manually operable latching means for retaining said gate in locked position, a second post extending upwardly from the other end of each of said bars and secured thereto, horizontally disposed braces extending between said first and second post, horizontally disposed cross pieces extending between said first post and between said second post, a pair of spaced parallel horizontally disposed rails secured to the upper surface of said platform, a first side wall including a pair of spaced parallel arms having clamps on their lower end slidably engaging said rails, a first manually operable means for adjusting the position of the lower end of said first side wall, a second manually operable means for adjusting the position of the upper end of said first side wall, a second side wall pivotally connected to said base, said first and second side walls each including a plurality of horizontally disposed spaced parallel removable rods, said second side wall being mounted for swinging movement about a horizontal axis, a cable having one end connected to said second side wall, pulleys supported by said frame and having said cable arranged in engagement therewith, a body member pivotally connected to one of said second posts and provided with an offset portion for coaction with the recess in said gate, an L-shaped support member connected to said side wall, a coil spring having one end connected to said support member and its other end connected to said frame, a pair of latches pivotally mounted on said frame for engaging the second side wall when the second side wall is in raised position, manually operable means for releasing said latches, a vertically adjustable end wall slidably mounted in said frame, and manually operable means for adjusting the position of said end wall.

2. In a cattle restraining chute as in claim 1, wherein guard plates are secured to said vertically disposed posts below said end wall.

3. In a cattle restraining chute as in claim 1, wherein a plate is mounted in each of said side walls adjacent the bottom thereof.

4. In a cattle restraining chute as in claim 1, wherein said end wall includes a plurality of horizontally disposed rods and a cable is connected to said end wall for adjusting the position thereof.

5. In a cattle restraining chute as in claim 1, wherein a stationary guide member is provided for maintaining said body member in its proper position.

References Cited in the file of this patent
UNITED STATES PATENTS

| | | |
|---|---|---|
| 2,308,213 | Shearer | Jan. 12, 1943 |
| 2,564,317 | Whiteworth | Aug. 14, 1951 |